United States Patent [19]

Masak et al.

[11] Patent Number: 4,516,126

[45] Date of Patent: May 7, 1985

[54] ADAPTIVE ARRAY HAVING AN AUXILIARY CHANNEL NOTCHED PATTERN IN THE STEERED BEAM DIRECTION

[75] Inventors: Raymond J. Masak, East Northport; Anthony M. Kowalski, Miller Place, both of N.Y.

[73] Assignee: Hazeltine Corporation, Commack, N.Y.

[21] Appl. No.: 431,543

[22] Filed: Sep. 30, 1982

[51] Int. Cl.[3] ........................... G01S 3/16; G01S 3/28

[52] U.S. Cl. ..................................... 343/383; 343/384

[58] Field of Search ............... 343/379, 380, 381, 383, 343/384

[56] References Cited

U.S. PATENT DOCUMENTS 3,876,947 4/1975 Giraudon ........................... 343/383
4,298,872 11/1981 Rodgers ............................. 343/380

*Primary Examiner*—Theodore M. Blum

*Attorney, Agent, or Firm*—E. A. Onders; F. R. Agovino

[57] ABSTRACT

An apparatus for cancelling undesired signals affecting an antenna system. The apparatus includes a plurality of adaptive modules. Each module provides sum and difference signals from a pair of antennas in the system. Each difference signal is weighted by an adaptive controller coupled to the difference signal and the apparatus output signal. All sum signals from the modules are sum and all weighted difference signals from modules are summed and the total weighted difference signal is subtracted from the total sum signal to provide an apparatus output. The adaptive controller is a multiplexer associated with each of the difference signals of the modules, a reference receiver receiving a multiplexed information and a correlator coupled to the received information and the apparatus output. The correlator controls the weights affecting each of the difference signals of each module. The output of the subtractor is decoded by a main receiver.

6 Claims, 4 Drawing Figures

ADAPTIVE ARRAY HAVING AN AUXILIARY CHANNEL NOTCHED PATTERN IN THE STEERED BEAM DIRECTION

The Government has rights in this invention pursuant to Contract No. F30602-76-C-0322 awarded by the Department of the Air Force.

BACKGROUND OF THE INVENTION

1. Field of the Invention

The invention generally relates to adaptive antennas and, in particular, an adaptive array incorporating automatic notches steering control in the steered beam direction.

2. Description of the Prior Art

One important measure of adaptive antenna performance is the available processed signal-to-noise plus jamming ratio (S/J+N) at the output of the system. Signal discriminants such as time, frequency, and polarization have been used to increase the S/J+N ratio. These techniques offer the improvement in one or both of the two ways: (1) increased cancellation of the jamming signal (J), and/or (2) minimizing the reduction. Spatial preprocessing functions such as beam steering, can also improve this contrast ratio.

SUMMARY OF THE INVENTION

It is an object of this invention to provide an antenna system, augmented with beam steering, capable of cancelling multiple intefering signals with minimum effect on the desired signal and a maximization of the processed S/J+N ratio.

An apparatus for cancelling jamming according to the invention comprises first and second antenna element ports for coupling to antenna elements of the system. First means coupled to the first and second ports provides a first sum signal at a first sum port representing a first sum of signals provided to said first and second ports by the antenna elements coupled thereto. The first means also provides a first difference signal at a first difference port representing a first difference of signals provided to the first and second antenna ports. A first adaptive control loop is coupled to the first difference port and has an output provided a first difference output signal corresponding to the first difference signal. Means for adding adds the first difference output signal and the first sum output signal. The means for adding has output port which is associated with the first adaptive control loop.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
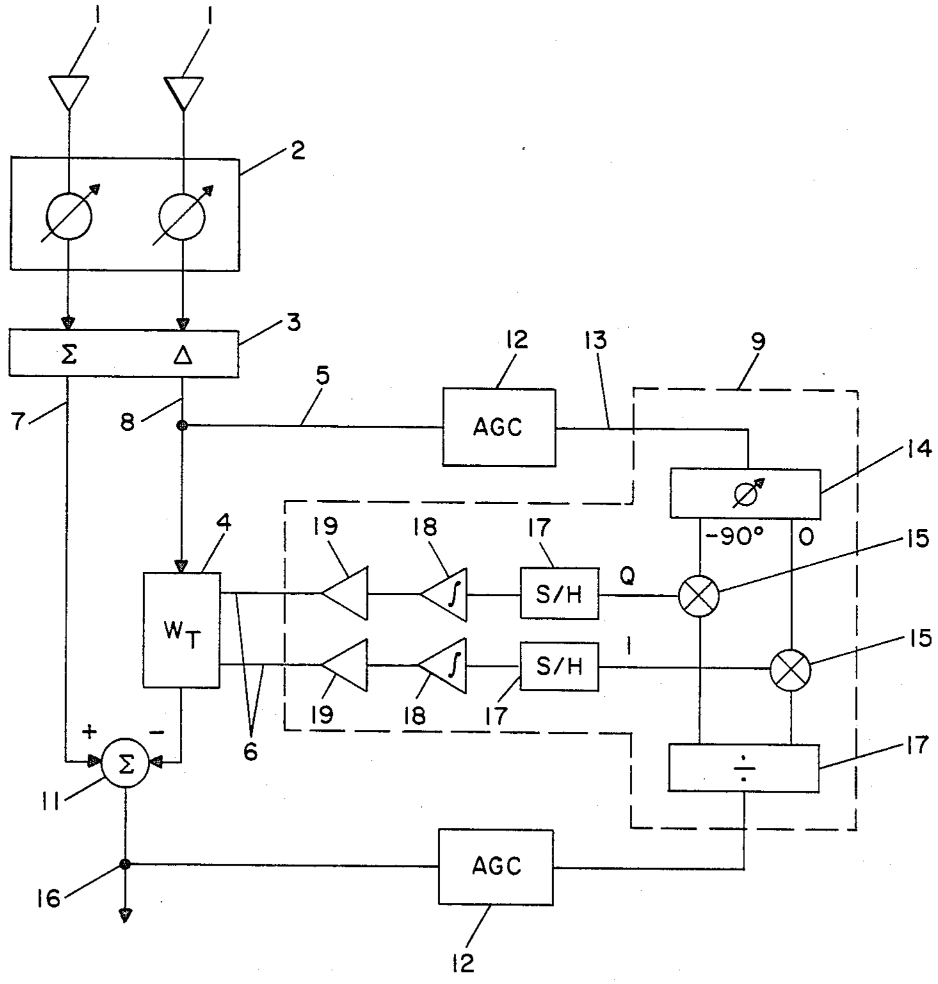
FIG. 1 is a block diagram of a two-element adaptive array with beam steering according to the invention.

The invention reduces the corruption of an adaptive array system caused by the presence of the desired signal at the outputs of the auxiliary antenna ports. FIG. 1 illustrates a two-element adaptive array incorporating automatic notched steering control in the steered beam direction. This array configuration uses direction of arrival as a means of discriminating between desired and undesired signals (i.e., it is assumed that the direction of arrival of the desired signal is known).

Automatic notched steering control in the steered beam direction is accomplished by adjusting the phase of the steering weights such that the resulting array pattern is peaked in the direction of the desired signal. In a conventional system, the auxiliary outputs would be taken from a set of omnidirectional elements of the main array such that the desired signal, as well as the interference signal, would appear at the auxiliary ports of the adaptive processor. As shown in FIG. 1, auxiliary array patterns are formed by taking a difference component of pairs of elements from the main array antenna. The difference patterns are obtained by combining the pair of elements 1 after phase shifters 2 in the sum/difference hybrid 3. The sum port 7 yields the main beam pattern while the difference port 8 is used as a separate input for the adaptive processor 9. No cancellation is possible in the steered direction because the difference port has no available signal for weighting.

Figure 2:
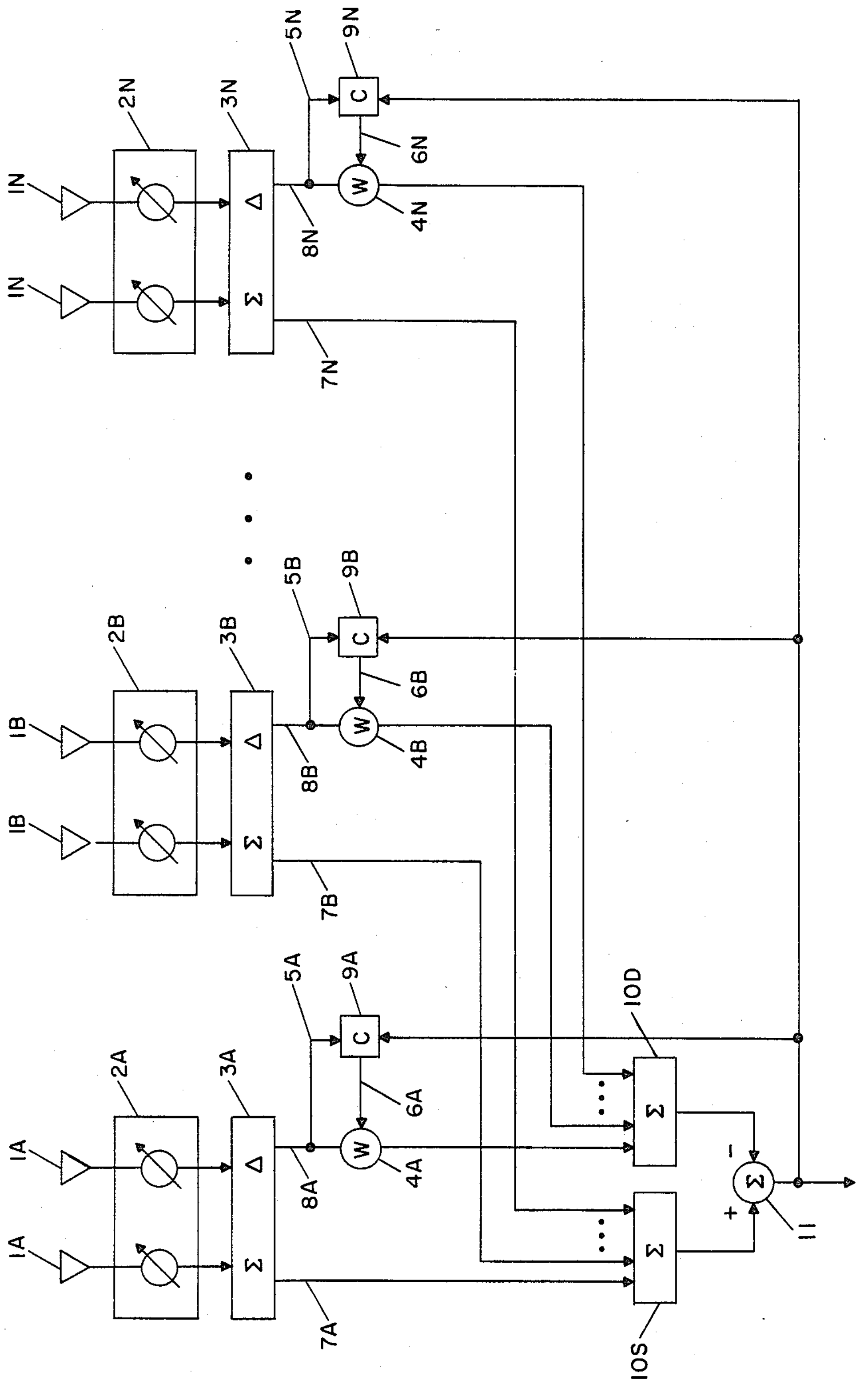
FIG. 2 is a block diagram illustrating a four-element adaptive array with beam steering according to the invention.
Figure 3:
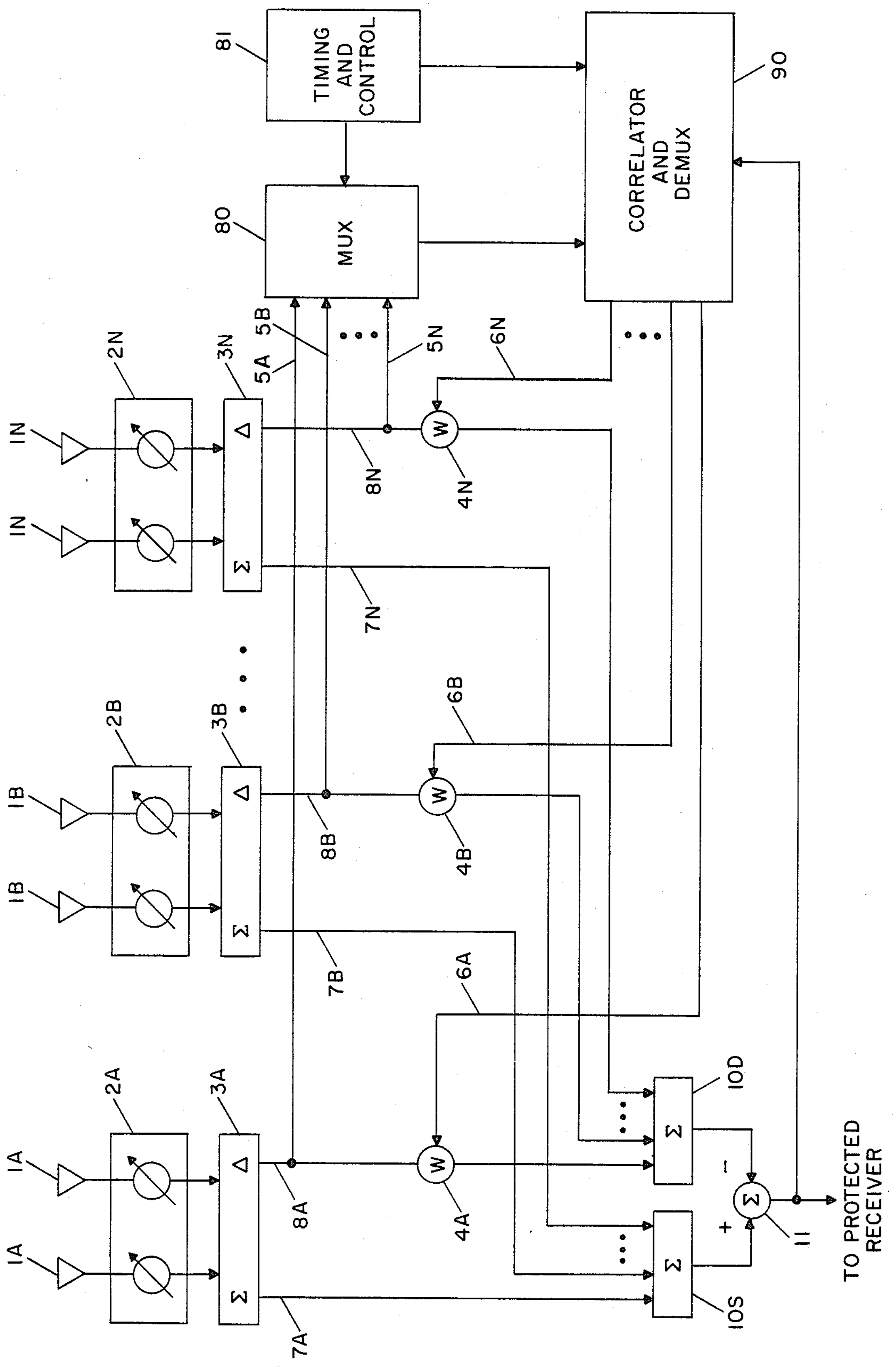
FIG. 3 is a block diagram illustrating a multi-element adaptive array with beam steering and a multiplexed, single adaptive controller according to the invention.

In the multi-pair arrays as illustrated in FIGS. 2 and 3, other undesired signals that arrive from different directions produce signals at one or more of the difference port outputs depending on the relative angle with respect to the steered direction. In each case, these undesired arriving signals are appropriately weighted by adapter processor 9 through a vector modulator such as complex weight 4 such that, when combined with the main beam output 7 by summer 11, they form a combined spatial null in the direction of the undesired signal(s). No cancellation can occur in the steered direction.

In order to achieve such cancellation, the signal appearing at difference port 8 is employed as processor input signal 5 and is adjusted in gain by automatic gain control 12. The AGC processor input signal 13 is provided to adaptive processor 9 which includes a quadrature hybrid 14 providing in-phase (I) and quadrature (Q) signals to mixers 15. Mixers 15 are also provided with system output signal 16 after AGC 12 and divider 17. The mixed in-phase and quadrature signals are stored in sample/hold circuits 17, integrated by integrators 18, adjusted in gain by amplifiers 19 and applied to complex weight 4 for combination with the signal from difference port 8.

FIGS. 2 and 3 illustrate in block diagram an adaptive array according to the invention wherein N pairs of elements are employed. In FIGS. 1 through 3 like reference characters refer to similar structure. Functionally, FIG. 2 is a combination of N modules wherein each module has the structure as shown in FIG. 1. Auxiliary antenna patterns are formed by taking the summation of the difference components of the pairs of elements from each of the modules. N total difference patterns are obtained by combining each pair of elements 1A, 1B, . . . , 1N in the sum/difference hybrids 3A, 3B, . . . , 3N. Each sum port 7A, 7B, . . . , 7N yields the main beam pattern of each module while each difference port 8A, 8B, . . . , 8N is used as a separate input for each adaptive processor 9A, 9B, . . . , 9N.

An undesired arriving signal, off-boresight, is nulled at each different port output by complex weight 4A, 4B, . . . , 4N. In each module, these undesired arriving signals are appropriately weighted by adaptive processor 9A, 9B, . . . , 9N through complex weight 4A, 4B, . . . , 4N, respectively, such that, when combined with the main beam output 7A, 7B, . . . , 7N by summer 11, they form a combined spatial null in the direction of the undesired signal(s). Again, no cancellation can occur in the boresight direction.

In order to achieve such cancellation in each module, the signal appearing at difference port 8A, 8B, . . . , 8N is employed as processor input signal 5A, 5B, . . . , 5N. This signal is provided to processor 9A, 9B, . . . , 9N which includes high frequency vector modulator weights which process the signals from difference ports 8A, 8B, . . . , 8N, respectively.

In the embodiment illustrated in FIG. 3, a significant reduction in the hardware required to achieve such nulling is illustrated. In particular, processor input signals 5A, 5B, . . . , 5N are provided to multiplexer 80 which is under the control of timing and control 81. This multiplexed information is provided to a correlator and demultiplexer 90 which provides the signal to weights 4A, 4B, . . . , 4N via line 6A, 6B, . . . , 6N, respectively. In both FIGS. 2 and 3, the sum signals are summed by summer 10S and the weighted difference signals are summed by summer 10D which are then combined by combiner 11 to provide an output signal and a signal which is fed back to the correlators for processing.

Figure 4:
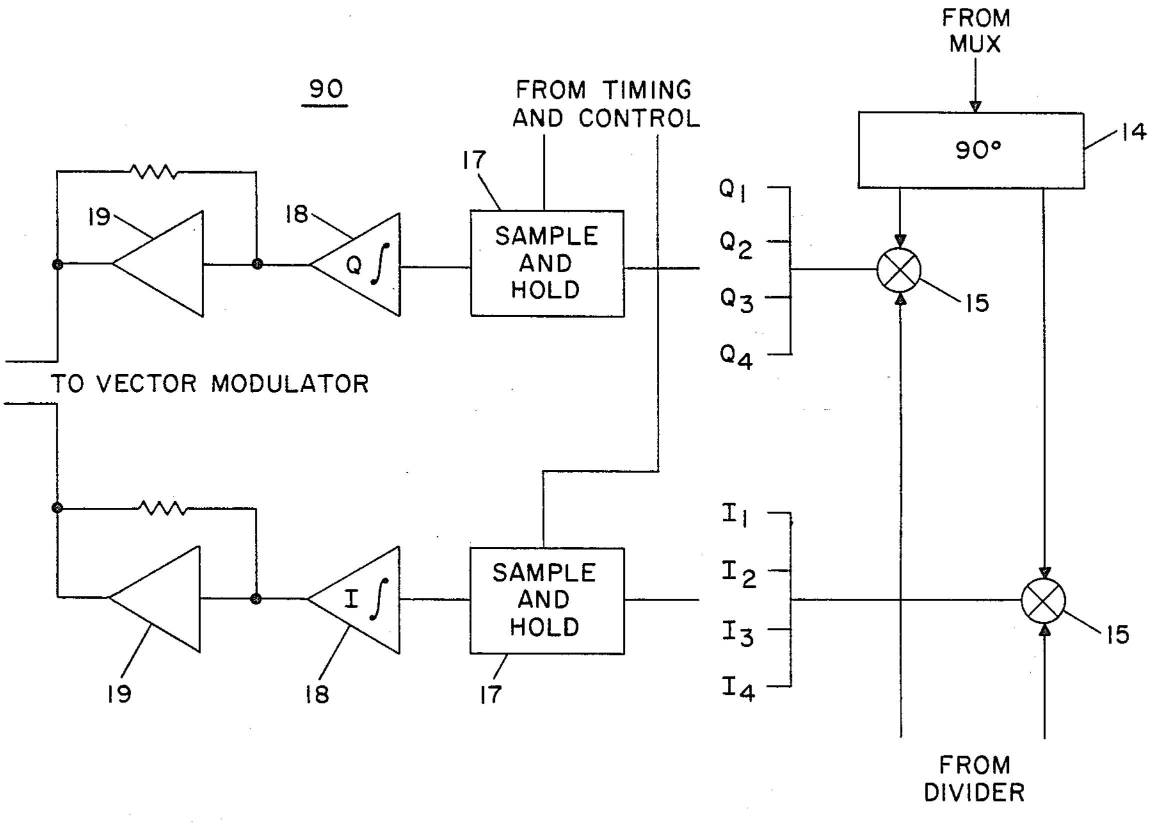
FIG. 4 is a block diagram of a demultiplexer/correlator according to the invention.

FIG. 4 illustrates a preferred embodiment of the demultiplexer/correlator 90 used in FIG. 3. Quadrature hybrid 14 provides in-phase and quadrature signals to mixers 15 which are also provided with the system output signal 16 after it has been divided. The mixed in-phase and quadrature signals are stored in sample/-hold circuits 17 controlled by the timing and control 81. These storage signals are integrated by integrators 18, adjusted in gain by amplifiers 19 and applied to complex weights 4A, 4B, . . . , 4N for combination with the signal from the difference port 8A, 8B, . . . , 8N, respectively. As a result of the demultiplexer/correlator 90, only one correlator and only one multiplexer are needed to process the signals in the adaptive loop of a multi-element array.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus for cancelling undesired signals affecting an antenna system having a plurality of antenna elements, said apparatus comprising:

(a) first, second, third and fourth ports, each said port for coupling one of said antenna elements of said system;

(b) first means coupled to said first and second ports for providing a first sum signal at a first sum port representing a first sum of signals provided to said first and second ports by the antenna elements coupled thereto and for providing a first difference signal at a first difference port representing a first difference of signals provided to said first and second antenna ports;

(c) a first adaptive control loop coupled to the first difference port and having an output providing a first difference output signal corresponding to the first difference signal; and (d) second means coupled to said third and fourth ports for providing a second sum signal at a second sum port representing a second sum of signals provided to said third and fourth ports by the antenna elements coupled thereto and for providing a second difference signal at a second difference port representing a second difference of signals provided to said third and fourth antenna ports;

(e) a second adaptive control loop coupled to the second difference port and having an output providing a second difference output signal corresponding to the second difference signal;

(f) means for summing the first sum signal and the second sum signal and having an output providing a total sum signal;

(g) means for summing the first difference output signal and the second difference output signal and having an output providing a total difference signal; and (h) means for adding the total difference signal and the total sum signal, said means for adding having an output port associated with said first and second control loops.

2. An apparatus for cancelling undesired signals affecting an antenna system having a plurality of antenna element pairs, said apparatus comprising:

(a) a plurality of adaptive modules each module comprising:

(1) first and second element ports for coupling to each of the antenna elements of one element pair of said system;

(2) first means coupled to said first and second ports for providing a first sum signal at a first sum port representing a first sum of signals provided to said first and second ports by the antenna elements coupled thereto and for providing a first difference signal at a first difference port representing a first difference of signals provided to said first and second antenna ports; and (3) means for weighting the first difference signal;

(b) means for summing the first sum signals of said modules and providing a total sum signal;

(c) means for summing the first difference signals of said modules and providing a total difference signal.

3. The apparatus of claim 2 wherein said means for controlling comprises:

(a) a multiplexer having inputs coupled to the first difference port of each module and having an output;

(b) an adaptive controller having an input coupled to the output of the multiplexer and having outputs coupled to said means for weighting; and (c) timing and control means associated with the multiplexer and the controller.

4. The apparatus of claims 2 or 3 further comprising means for steering a beam of radiation received by said antenna elements whereby automatic notched steering control in the beam steered direction is achieved.

5. An apparatus for cancelling undesired signals affecting an antenna system, said apparatus comprising:

(a) a plurality of adaptive modules each module comprising:

(1) first and second element ports for coupling to antenna elements of said system;

(2) first means coupled to said first and second ports for providing a first sum signal at a first sum port representing a first sum of signals provided to said first and second ports by the antenna elements coupled thereto and for providing a first difference signal at a first difference port representing a first difference of signals provided to said first and second antenna ports; and (3) means for weighting the first difference signal;

(b) means for summing the first sum signals of said modules and for providing a total sum signal;

(c) means for summing the first difference signals of said modules and providing a total difference signal;

(d) a multiplexer, correlator and demultiplexer responsive to the first difference signals of the modules for controlling each of said means for weighting; and (e) means for adding the total difference signal and the total sum signal and providing an output signal, said output signal associated with the correlator.

6. The apparatus of claim 5 wherein said correlator and demultiplexer comprise, in series, a 90° hybrid providing in-phase and quadrature outputs, the in-phase output in series with a first sample and hold circuit, a first integrator and a first amplifier; and the quadrature output in series with a second sample and hold circuit, a second integrator and a second amplifier.

* * * * *